United States Patent [19]

Hoek et al.

[11] Patent Number: 4,517,396

[45] Date of Patent: May 14, 1985

[54] PROCESS FOR THE PREPARATION OF MIDDLE DISTILLATES

[75] Inventors: Arend Hoek; Eduard P. Kieffer, both of Amsterdam, Netherlands

[73] Assignee: Shell Oil Company, Houston, Tex.

[21] Appl. No.: 610,543

[22] Filed: May 15, 1984

[30] Foreign Application Priority Data

May 17, 1983 [NL] Netherlands ................... 8301747

[51] Int. Cl.[3] .................... C07C 3/03; C07C 3/10
[52] U.S. Cl. ................................ 585/415; 585/418; 585/533; 585/525
[58] Field of Search ............... 585/415, 533, 525, 417, 585/418

[56] References Cited

U.S. PATENT DOCUMENTS

| | | | |
|---|---|---|---|
| 3,775,501 | 11/1973 | Kaeding et al. | 585/415 |
| 3,843,741 | 10/1974 | Yan | 585/415 |
| 3,960,978 | 6/1976 | Givens et al. | 585/415 |
| 4,430,516 | 2/1984 | La Pierre et al. | 585/415 |
| 4,433,185 | 2/1984 | Tabak | 585/415 |
| 4,444,988 | 4/1984 | Capsuto et al. | 585/415 |
| 4,450,311 | 5/1984 | Wright et al. | 585/415 |
| 4,451,685 | 5/1984 | Nevitt et al. | 585/415 |
| 4,456,779 | 6/1984 | Owen et al. | 585/415 |

*Primary Examiner*—D. E. Gantz
*Assistant Examiner*—A. Pal

[57] ABSTRACT

A process for converting $C_2$–$C_5$ olefins into middle distillates at a temperature of 150°–300° C. over a catalyst which has been prepared by depositing at least 0.1% w Ni or Co by ion exchange onto a crystalline metal silicate having a ZSM-5 structure.

14 Claims, No Drawings

PROCESS FOR THE PREPARATION OF MIDDLE DISTILLATES

BACKGROUND OF THE INVENTION

The invention relates to a process for the preparation of middle distillates from one or more mono-olefins having at most five carbon atoms per molecule (for the sake of brevity hereinafter referred to as "$C_5^-$-olefins") or from aliphatic hydrocarbon mixtures consisting more than 50%w of $C_5^-$-olefins by using a catalyst comprising a crystalline metal silicate of a special structure.

$C_5^-$-olefins and aliphatic hydrocarbon mixtures consisting more than 50%w of $C_5^-$-olefins can be converted in high yields into aromatic hydrocarbon mixtures by contacting them at a temperature above 400° C. with a catalyst comprising a crystalline metal silicate of a special structure. Said crystalline metal silicates are characterized in that after one hour's calcination in air at 500° C. they have the following properties:

(a) an X-ray powder diffraction pattern in which the strongest lines are the four lines mentioned in Table A,

TABLE A

| d(Å) |
| --- |
| 11.1 ± 0.2 |
| 10.0 ± 0.2 |
| 3.84 ± 0.07 |
| 3.72 ± 0.06; and |

(b) in addition to $SiO_2$, one or more oxides of a trivalent metal A chosen from aluminum, iron, gallium, rhodium, chromium and scandium are present, and in which the $SiO_2/A_2O_3$ molar ratio is higher than 10.

The hydrocarbon mixtures thus obtained consist substantially of components boiling in the gasoline range and contain only few components boiling in the middle distillate range. Consequently the abovementioned conversion of olefins is an unattractive route for the preparation of middle distillates on a technical scale.

As examples of prior art processes, U.S. Pat. No. 4,211,640 discloses a process whereby a gasoline having a olefinic content of at least 50%wt is converted into a product comprising both fuel oil and gasoline with enhanced gum stability over a H±ZSM-5 catalyst at a temperature of 177°–316° C. Also, U.S. Pat. No. 4,227,992 converts $C_3$–$C_5$ olefins, which are present in a $C_2$–$C_5$ olefin mixture, into a product comprising both fuel oil and gasoline over a H±ZSM-5 catalyst at a temperature of 149°–316° C. In addition, U.S. Pat. No. 3,845,150 describes the preparation of aromatic gasoline from lower olefins at a temperature of 343°–816° C. over ZSM-5, which may contain metals such as rare earth, magnesium, zinc, calcium, nickel and mixtures thereof.

In this patent application "middle distillates" should be taken to be hydrocarbon mixtures whose boiling range corresponds subtantially with that of the kerosene and gas oil fractions obtained in the conventional atmospheric distillation of crude mineral oil. During said distillation, from the crude mineral oil are separated in succession: one or more gasoline fractions having a boiling range between 30° and 200° C., one or more kerosene fractions having a boiling range between 140° and 300° C. and one or more gasoil fractions having a boiling range between 180° and 370° C.

It has been found that $C_5^-$-olefins and aliphatic hydrocarbon mixtures consisting more than 50%w of $C_5^-$-olefins can be converted in high yields into a hydrocarbon mixture a considerable part of which consists of components boiling in the middle distillate range by contacting the feed at a temperature between 150° and 300° C. with a crystalline metal silicate having the properties mentioned hereinbefore under (a) and (b) above, which metal silicate comprises at least 0.1%w nickel and/or cobalt deposited thereon by means of ion exchange. The principle underlying the present invention is a combination of the use of a low reaction temperature with the use of a crystalline metal silicate upon which nickel and/or cobalt has been deposited by ion exchange. Only if both these requirements are met will a product be obtained a considerable part of which consists of components boiling in the middle distillates range. Neither of these measures alone—for instance using a low reaction temperature, but combined with the use of a crystalline metal silicate onto which nickel or cobalt has been deposited by impregnation, or using a crystalline metal silicate onto which nickel or cobalt has been deposited by ion exchange, but combined with the use of a high reaction temperature—will produce the desired results.

SUMMARY OF THE INVENTION

The present patent application therefore relates to a process for the preparation of middle distillates in which one or more $C_5^-$-olefins or aliphatic hydrocarbon mixtures consisting more than 50%w of $C_5^-$-olefins are contacted at a temperature between 150° and 300° C. with a catalyst comprising a crystalline metal silicate which after one hour's calcination in air at 500° C. has the properties mentioned hereinbefore under (a) and (b) and which metal silicate comprises at least 0.1%w nickel and/or cobalt which has been deposited thereon by means of ion exchange.

DETAILED DESCRIPTION OF THE INVENTION

In the process according to the invention the starting material should be one or more $C_5^-$-olefins or an aliphatic hydrocarbon mixture consisting more than 50%w of $C_5^-$-olefins. Suitable $C_5^-$-olefins are ethene, propene, n-butenes, isobutene, n-pentenes and isopentenes. If the starting material is a hydrocarbon mixture which in addition to one or more $C_5^-$-olefins contains other aliphatic hydrocarbons as well, the latter hydrocarbons may be, among others, paraffins, di-olefins and $C_6^+$ mono-olefins. In the process according to the invention the preferred feed is a feed which consists more than 75%w and in particular substantially completely of one or more $C_5^-$-olefins. Special preference is given to propene and butenes as $C_5^-$-olefins. A feed very suitable for the present process is a hydrocarbon mixture substantially consisting of $C_5^-$-olefins which has been obtained as by-product in the catalytic or thermal cracking of hydrocarbons, particularly in thermal cracking for the preparation of ethene. Suitable feeds of the present process can also be prepared starting from synthesis gas. To this end the synthesis gas may be first converted into methanol, which can then be converted into a product substantially consisting of $C_5^-$-olefins. The synthesis gas may also be converted according to Fischer-Tropsch into a hydrocarbon mixture which in addition to other hydrocarbons contains a considerable amount of $C_5^-$-olefins. The synthesis gas required may very suitably be prepared from heavy carbonaceous materials, such as coal, or from light hydrocarbons, such as natural gas, by subjecting these to steam reforming or partial oxidation.

The process according to the invention is carried out at a temperature between 150° and 300° C. and preferably at a pressure below 50 bar and a space velocity of 0.1–10 g.g$^{-1}$.h$^{-1}$. Special preference is given to the following reaction conditions: a temperature of 175°–250° C., a pressure below 30 bar and a space velocity of 0.25–5 g.g$^{-1}$.h$^{-1}$. If desired, the process may be carried out in the presence of hydrogen.

In the present process the catalyst used is a crystalline metal silicate comprising at least 0.1%w nickel and/or cobalt deposited thereon by ion exchange. The maximum quantity of nickel and/or cobalt that can be deposited on the crystalline metal silicate by means of ion exchange is determined by the $SiO_2/A_2O_3$ molar ratio of the silicate, said quantity being larger according as the silicate has a lower $SiO_2/A_2O_3$ molar ratio. Preference is given to the use of crystalline metal silicates onto which at most 7.5%w nickel and/or cobalt has been deposited by means of ion exchange. Particular preference is given to the use of crystalline metal silicates comprising 0.2–5%w nickel and/or cobalt.

In the present process use is preferably made of a crystalline metal silicate which as trivalent metals A comprises one or more of the metals aluminum, iron or gallium. The crystalline silicates should have a $SiO_2/A_2O_3$ molar ratio which is higher than 10. Use is preferably made of silicates having a $SiO_2/A_2O_3$ molar ratio lower than 1000 and in particular between 20 and 500. The crystalline silicates are defined among other things by their X-ray powder diffraction pattern after one hour's calcination in air at 500° C. In this pattern the strongest lines should be the four lines mentioned in Table A. The complete X-ray powder diffraction pattern of a typical example of the present crystalline silicates after one hour's calcination in air at 500° C. is given in Table B.

TABLE B

| d(Å) | Rel. int. | d(Å) | Rel. int. |
|---|---|---|---|
| 11.1 | 100 | 3.84 (D) | 57 |
| 10.0 (D) | 70 | 3.72 (D) | 31 |
| 8.93 | 1 | 3.63 | 16 |
| 7.99 | 1 | 3.47 | <1 |
| 7.42 | 2 | 3.43 | 5 |
| 6.68 | 7 | 3.34 | 2 |
| 6.35 | 11 | 3.30 | 5 |
| 5.97 | 17 | 3.25 | 1 |
| 5.70 | 7 | 3.05 | 8 |
| 5.56 | 10 | 2.98 | 11 |
| 5.35 | 2 | 2.96 | 3 |
| 4.98 (D) | 6 | 2.86 | 2 |
| 4.60 | 4 | 2.73 | 2 |
| 4.35 | 5 | 2.60 | 2 |
| 4.25 | 7 | 2.48 | 3 |
| 4.07 | 2 | 2.40 | 2 |
| 4.00 | 4 | | |

(D) = doublet

The crystalline silicates may be prepared starting from an aqueous mixture comprising the following compounds: one or more silicon compounds, one or more compounds which contain a monovalent organic cation (R) or from which such a cation is formed during the preparation of the silicate, one or more compounds in which a trivalent metal A occurs and, if desired, one or more compounds of an alkali metal (M). The preparation is carried out by maintaining the mixture at an elevated temperature until the silicate has formed and subsequently separating the silicate crystals from the mother liquor and washing, drying and calcining the crystals. In the aqueous mixture from which the silicates are prepared the various compounds should be present in the following ratios, expressed in moles of the oxides:
$M_2O:SiO_2 < 0.35$,
$R_2O:SiO_2 = 0.01–0.5$,
$SiO_2:A_2O_3 > 10$, and
$H_2O:SiO_2 = 5–100$.

The crystalline silicated prepared in the manner described hereinbefore contain exchangeable cations. The preparation of the catalysts to be used in the present process from these crystalline silicates preferably comprises first replacing at least part of the exchangeable cations present in the crystalline silicate by ammonium ions by contacting the silicate with a solution of an ammonium compound and subsequently replacing at least part of the ammonium ions thus introduced into the silicate by cobalt and/or nickel ions by contacting the silicate with a cobalt and/or nickel compound. After termination of the ion exchange the silicate loaded with cobalt and/or nickel is washed, dried and calcined.

The invention is now illustrated with the aid of the following example.

EXAMPLE

Two crystalline metal silicates (silicates 1 and 2) were prepared by heating mixtures of NaOH, amorphous silica, $(C_3H_7)_4NOH$ and $Ga(NO_3)_3$ (for the preparation of silicate 1) or $NaAlO_2$ (for the preparation of silicate 2) in water in an autoclave under autogeneous pressure for 24 hours at 150° C. After cooling of the reaction mixtures the silicates formed were filtered off, washed with water until the pH of the wash water was about 8, and dried at 120° C. After one hour's calcination in air at 500° C. silicates 1 and 2 had the following properties:

(a) an X-ray powder diffraction pattern substantially corresponding with that mentioned in Table B, (b) values for the $SiO_2/Ga_2O_3$ and $SiO_2/Al_2O_3$ molar ratios of 77 and 250, respectively.

From silicates 1 and 2 were prepared silicates I and II, respectively by boiling silicates 1 and 2 with a 1.0 molar $NH_4NO_3$ solution, washing with water, boiling again with a 1.0 molar $NH_4NO_3$ solution and washing and drying.

From silicates I and II catalysts A–C were prepared as follows.

Catalyst A

This catalyst was prepared starting from silicate I by means of ion exchange. The preparation was carried out by boiling silicate I with an aqueous solution of cobalt nitrate, followed by washing, drying and calcination of the composition. Catalyst A contained 0.9%w cobalt.

Catalyst B

This catalyst was prepared starting from silicate II by means of ion exchange. The preparation was carried out by boiling silicate II with an aqueous solution of nickel nitrate, followed by washing, drying and calcination of the composition. Catalyst B contained 0.3%w nickel.

Catalyst C

This catalyst was prepared starting from silicate II by means of impregnation. The preparation was carried out by contacting silicate II with a quantity of an aqueous solution of cobalt nitrate the volume of which corresponded substantially with the pore volume of the silicate, followed by drying and calcination of the composition. Catalyst C contained 0.2%w cobalt.

Catalyst A, B, and C, and silicate II in its original state were tested in eight experiments (Experiments 1-8) for the preparation of hydrocarbon mixtures form propene. The experiments were carried out at various temperatures, pressures and space velocities in a reactor containing a fixed catalyst bed. The conditions under which the experiments were carried out as well as the results of the experiments are given in Table C.

Of the Experiments 1-8, given in Table C, only Experiments 1-4 are experiments according to the invention. These experiments, which were carried out at a temperature between 150° and 300° C. and using a cobalt- or nickel-loaded crystalline metal silicate onto which the cobalt and nickel had been deposited by ion exchange, yielded liquid products which consisted more than 60%w of hyrocarbons boiling in the middle distillate range (140°-370° C.). Experiments 5-8 fall outside the scope of the invention. They have been included in the patent application for comparison. In Experiment 5 the temperature used was higher than 300° C. In Experiments 6 and 7 use was made of a crystalline metal silicate which contained no nickel or cobalt. Moreover, in Experiment 6 the temperature used was higher than 300° C. Although in Experiment 8 a cobalt-loaded crystalline metal silicate was used, said cobalt had been deposited on the silicate by impregnation.

As regards the results given in Table C the following may be observed.

(1) Comparison of the results of Experiments 2, 3 and 4 shows that in the process according to the invention the production of middle distillate is hardly affected by variations in pressure, whereas it is strongly affected by variations in temperature.

(2) In Experiment 5 the temperature used was much too high, and it yields a liquid product which consisted substantially of gasoline and contained only very little middle distillate. The results of Experiment 6 show that at this high reaction temperature, even if the crystalline metal silicate contains no cobalt or nickel, a similar product distribution is obtained.

(3) Comparison of the results of Experiments 6 and 7 shows that by decreasing the reaction temperature there can be obtained a rise in the production of middle distillate at the cost of the gasoline production. However, the yield of middle distillate which was obtained at the low temperature was deemed insufficient.

(4) In Experiment 8 no liquid product was obtained. This experiment demonstrates the importance of the manner in which the cobalt or nickel has been deposited on the silicate where the silicate's performance as a catalyst in the process according to the invention is concerned.

When catalyst A is used at temperatures between 175° and 250° C. for the conversion of butene and mixtures of propene and butene, liquid products are obtained which consist more than 60%w of hydrocarbons boiling in the middle distillate range.

TABLE C

| Experiment No. | 1 | 2 | 3 | 4 | 5 | 6 | 7 | 8 |
|---|---|---|---|---|---|---|---|---|
| Catalyst | A | B | B | B | B | Silicate II | Silicate II | C |
| Temperature, °C. | 210 | 210 | 210 | 245 | 450 | 450 | 210 | 210 |
| Pressure, bar | 1.5 | 1.5 | 15 | 1.5 | 1.5 | 1.5 | 1.5 | 1.5 |
| Space velocity | 0.5 | 0.5 | 0.5 | 1.0 | 2.0 | 2.0 | 0.5 | 0.5 |

TABLE C-continued $g \cdot g^{-1} \cdot h^{-1}$.

| Composition $C_5^+$ product, %w | | | | | | | | |
|---|---|---|---|---|---|---|---|---|
| $C_5$-140° C. | 20 | 26 | 15 | 37 | 92 | 94 | 56 | — |
| 140-370° C. | 80 | 71 | 72 | 63 | 8 | 6 | 43 | — |
| 370° C.+ | — | 3 | 13 | — | — | — | 1 | — |
| Aromatics content $C_5^+$ product, %w | 0.3 | 0.2 | 0.1 | 0.2 | 23 | 20 | 0.2 | — |

What is claimed is:

1. A process for the preparation of middle distillates, characterized in that a feed comprising one or more mono-olefins having at most five carbon atoms per molecule, or aliphatic hydrocarbon mixtures consisting more than 50%w of said olefins, is contacted at a temperature between 175° and 250° C. with a catalyst comprising a crystalline metal silicate which after one hour's calcination in air at 500° C. has the following properties:
   (a) an X-ray powder diffraction pattern which the strongest lines are the four lines mentioned in Table A,

TABLE A

| d(Å) |
|---|
| 11.1 ± 0.2 |
| 10.0 ± 0.2 |
| 3.84 ± 0.07 |
| 3.72 ± 0.06; and |

(b) in addition to $SiO_2$, one or more oxides of a trivalent metal A chosen from aluminum, iron, gallium, rhodium, chromium and scandium are present, and in which the $SiO_2/A_2O_3$ molar ratio is higher than 10;

which metal silicate comprises at least 0.1%w nickel and/or cobalt which has been deposited thereon by means of ion exchange.

2. The process of claim 1, characterized in that the feed consists of more than 75%w of one or more mono-olefins having at most five carbon atoms per molecule.

3. The process of claim 1, characterized in that the mono-olefins consist substantially of propene and/or butenes.

4. The process of claim 1, characterized in that the feed used is a hydrocarbon mixture substantially consisting of mono-olefins, which mixture has been obtained as by-product in the catalytic or thermal cracking of hydrocarbons.

5. The process of claim 1, characterized in that the feed used is a hydrocarbon mixture substantially consisting of mono-olefins, which mixture has been obtained starting from synthesis gas by either converting the synthesis gas according to Fischer-Tropsch or converting the synthesis gas into methanol and subsequently converting the methanol into mono-olefins.

6. The process of claim 5, characterized in that the synthesis gas has been prepared from heavy carbonaceous materials, such as coal, or from light hydrocarbons, such as natural gas, by subjecting these to steam reforming or partial oxidation.

7. The process of claim 1, characterized in that it is carried out at a pressure lower than 50 bar and a space velocity of 0.1–10 g.g$^{-1}$.h$^{-1}$.

8. The process of claim 7, characterized in that it is carried out at a pressure lower than 30 bar and a space velocity of 0.25–5 g.g$^{-1}$.h$^{-1}$.

9. The process of claim 1, characterized in that the crystalline silicate comprises at most 7.5%w nickel and/or cobalt.

10. The process of claim 9, characterized in that the crystalline silicate comprises 0.2–5%w nickel and/or cobalt.

11. The process of claim 1, characterized in that the crystalline silicate has a $SiO_2/A_2O_3$ molar ratio lower than 1000.

12. The process of claim 11, characterized in that the crystalline silicate has a $SiO_2/A_2O_3$ molar ratio between 20 and 500.

13. The process of claim 1, characterized in that as trivalent metals A the crystalline silicate comprises one or more of the metals aluminum, iron and gallium.

14. The process of claim 1, characterized in that cobalt and/or nickel have been deposited on the crystalline silicate by first replacing at least part of the exchangeable cations present in the crystalline silicate by ammonium ions and subsequently replacing at least part of the ammonium ions thus introduced into the silicate by cobalt and/or nickel ions.

* * * * *